(No Model.)
E. F. PFLUEGER.
SLACK LINE ATTACHMENT FOR FISHING RODS.
No. 468,227. Patented Feb. 2, 1892.
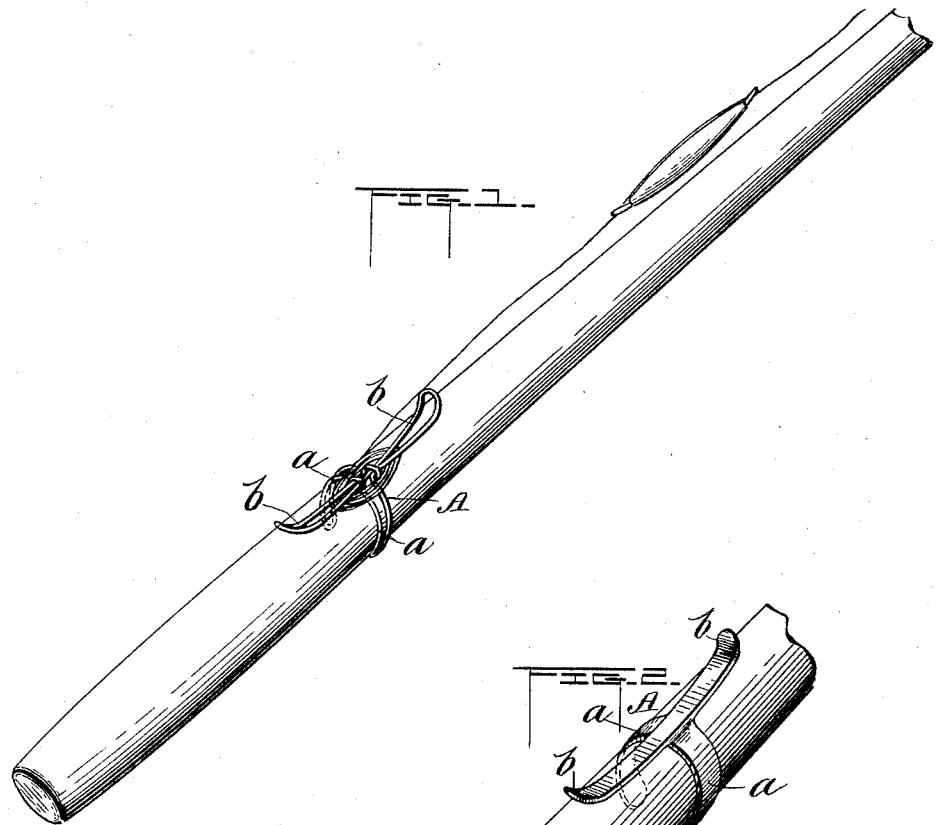
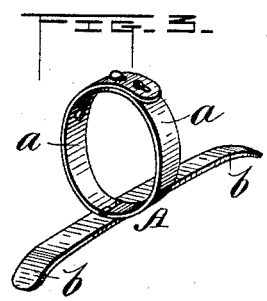
Witnesses
Severance.
Philip C. Mari.
Inventor
E. F. Pflueger
by E. W. Anderson
his Attorney

UNITED STATES PATENT OFFICE.

ERNEST F. PFLUEGER, OF AKRON, OHIO.

SLACK-LINE ATTACHMENT FOR FISHING-RODS.

SPECIFICATION forming part of Letters Patent No. 468,227, dated February 2, 1892.

Application filed October 31, 1891. Serial No. 410,510. (No model.)

*To all whom it may concern:*

Be it known that I, ERNEST F. PFLUEGER, a citizen of the United States, and a resident of Akron, in the county of Summit and State of Ohio, have invented certain new and useful Improvements in Slack Line, Hook, and Float Attachments for Fish-Poles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of wire attachment and rod. Fig. 2 is a perspective view of the sheet-metal clamp attached to rod. Fig. 3 is a perspective view of the clamp detached, showing the arms in locked position.

This invention has relation to a slack-line attachment for fish-poles, the object being to provide a simple device of this character, which may be readily clamped to any-sized fish-pole for the attachment of slack hook, line, and float; and the invention consists in the novel construction and combination of parts as hereinafter specified.

In the accompanying drawings, the letter A designates the clamp, which in Fig. 1 is shown as consisting of the curved spring-wire arms $a$ $a$, which are designed to encircle or partially encircle the base portion of a fish-pole and retaining themselves in place by reason of their inherent elasticity or spring. Connected thereto are the arms $b$ $b$, designed to carry the line.

In Fig. 2 I have shown the clamp as stamped out of sheet metal of an elastic or spring character instead of being formed of wire, as shown in Fig. 1.

In Fig. 3 I have shown the arms $a$ $a$ as formed of material not necessarily of a spring character, said arms being designed to encircle the pole, overlapping each other at their meeting portions, and locking themselves in place by means of a series of locks or catches $e$.

It will be seen that each of the above described forms will readily adjust itself to any size of pole ordinarily used and will retain the device in place.

Having described this invention, what I claim as new, and desire to secure by Letters Patent, is—

1. The slack-line attachment for fish-poles, comprising the arms $b$ $b$, having secured thereto a pair of curved arms adapted to encircle and clasp a fish-pole, substantially as specified.

2. The slack-line attachment for fish poles, comprising the line-holding arms having secured thereto a pair of curved spring-arms adapted to clasp a fish-pole, substantially as specified.

In testimony whereof I affix my signature in presence of witnesses.

ERNEST F. PFLUEGER.

Witnesses:
T. W. WAKEMAN,
E. C. ROBINSON,
FRANK A. FOSTER.